United States Patent
Bagard et al.

(10) Patent No.: US 11,555,526 B2
(45) Date of Patent: Jan. 17, 2023

(54) TORSION DAMPING DEVICE WITH ACTIVATABLE FRICTION DEVICE

(71) Applicant: VALEO EMBRAYAGES, Amiens (FR)

(72) Inventors: Didier Bagard, Amiens (FR); Pierre Boucheny, Amiens (FR); Olivier Marechal, Amiens (FR); Roel Verhoog, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 238 days.

(21) Appl. No.: 16/649,366

(22) PCT Filed: Sep. 21, 2018

(86) PCT No.: PCT/FR2018/052317
§ 371 (c)(1),
(2) Date: Mar. 20, 2020

(87) PCT Pub. No.: WO2019/058070
PCT Pub. Date: Mar. 28, 2019

(65) Prior Publication Data
US 2020/0248752 A1  Aug. 6, 2020

(30) Foreign Application Priority Data

Sep. 22, 2017  (FR) ..................... 1758778

(51) Int. Cl.
*F16F 15/129* (2006.01)
*F16F 15/123* (2006.01)

(52) U.S. Cl.
CPC .... *F16F 15/1292* (2013.01); *F16F 15/12353* (2013.01)

(58) Field of Classification Search
CPC ............. F16F 15/12353; F16F 15/1236; F16F 15/12366; F16F 15/12373; F16F 15/1292;
(Continued)

(56) References Cited

U.S. PATENT DOCUMENTS 4,354,586 A * 10/1982 Stanley ............. F16F 15/12373
192/213.31
5,884,743 A * 3/1999 Kleifges ............. F16F 15/1292
192/213.12
(Continued)

FOREIGN PATENT DOCUMENTS

CN  1924393 A  3/2007
DE  10052783 A1 *  5/2002  ............ F16F 15/131
(Continued)

OTHER PUBLICATIONS

Combined Chinese Office Action and Search Report dated May 31, 2021 in corresponding Chinese Patent Application No. 201880069039.5 (with English Translation and English Translation of Category of Cited Documents), 17 pages.
(Continued)

*Primary Examiner* — Josh Skroupa
*Assistant Examiner* — David M Griffin
(74) *Attorney, Agent, or Firm* — Oblon, McClelland, Maier & Neustadt, L.L.P.

(57) ABSTRACT

A torsion damping device for a vehicle drivetrain includes: a first rotary element, a second rotary element, an elastic device, a friction device including an actuating washer mounted to rotate as one with a friction washer and including an actuating tab interposed circumferentially between a first end of a spring and the first rotary element so as to allow relative rotation between the actuating washer and the second rotary element when the first end of the spring is compressed by the first rotary element in the direction of a second end of the spring opposite to the first end.

15 Claims, 6 Drawing Sheets

(58) Field of Classification Search
CPC ............. F16F 15/1297; F16F 15/13469; F16F 15/13476; F16F 15/13484; F16F 15/13492; F16F 15/139; F16F 15/1392; F16F 15/1395; F16F 15/1397
USPC .............................................. 464/68.4, 68.41
See application file for complete search history.

(56) References Cited

U.S. PATENT DOCUMENTS

| | | | | |
|---|---|---|---|---|
| 6,257,089 B1* | 7/2001 | Hashimoto | ......... | F16F 15/1238 192/213.12 |
| 2004/0185941 A1* | 9/2004 | Uehara | ............... | F16F 15/1292 464/68.8 |
| 2010/0243404 A1* | 9/2010 | Saeki | ................... | F16F 15/1292 464/68.4 |
| 2012/0205213 A1* | 8/2012 | Sudau | ................. | F16D 25/0635 192/3.21 |

FOREIGN PATENT DOCUMENTS

| | | | | |
|---|---|---|---|---|
| DE | 102009002968 A1 * | 11/2010 | .......... | F16F 15/1238 |
| EP | 1 760 357 A1 | 3/2007 | | |
| FR | 2 890 139 | 3/2007 | | |
| FR | 2890139 A1 * | 3/2007 | .......... | F16F 15/1292 |
| FR | 3 041 399 A1 | 3/2017 | | |
| JP | 2009-185847 A | 8/2009 | | |
| WO | WO-2012060263 A1 * | 5/2012 | ............. | F16D 13/64 |

OTHER PUBLICATIONS

International Search Report dated Dec. 14, 2018 in PCT/FR2018/052317 filed on Sep. 21, 2018, 2 pages.

* cited by examiner

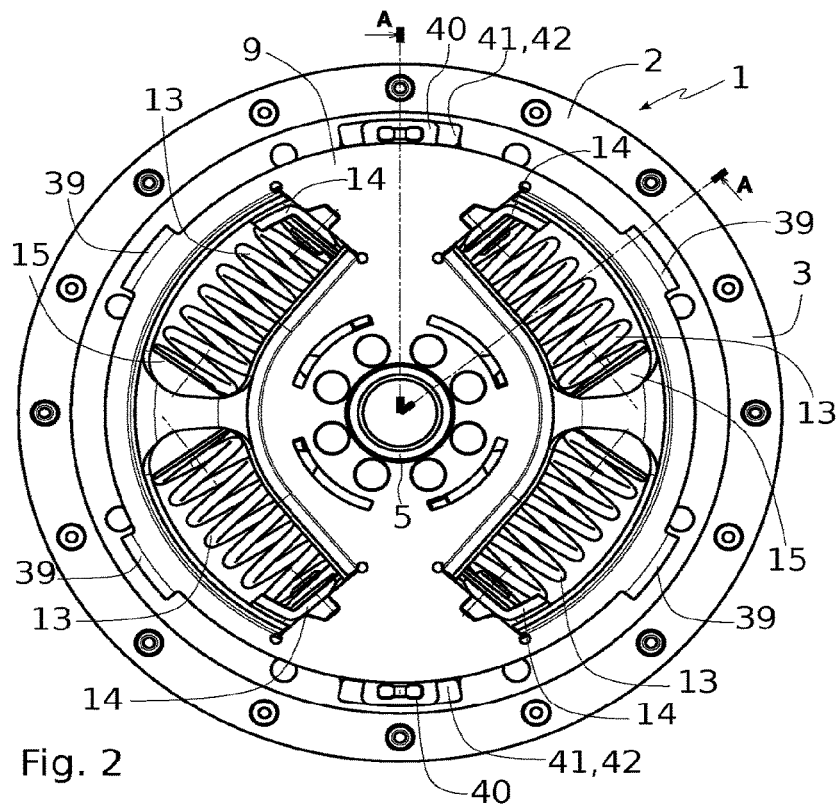
Fig. 2
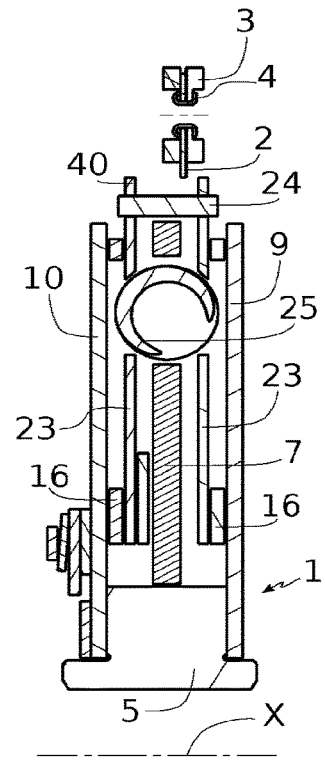
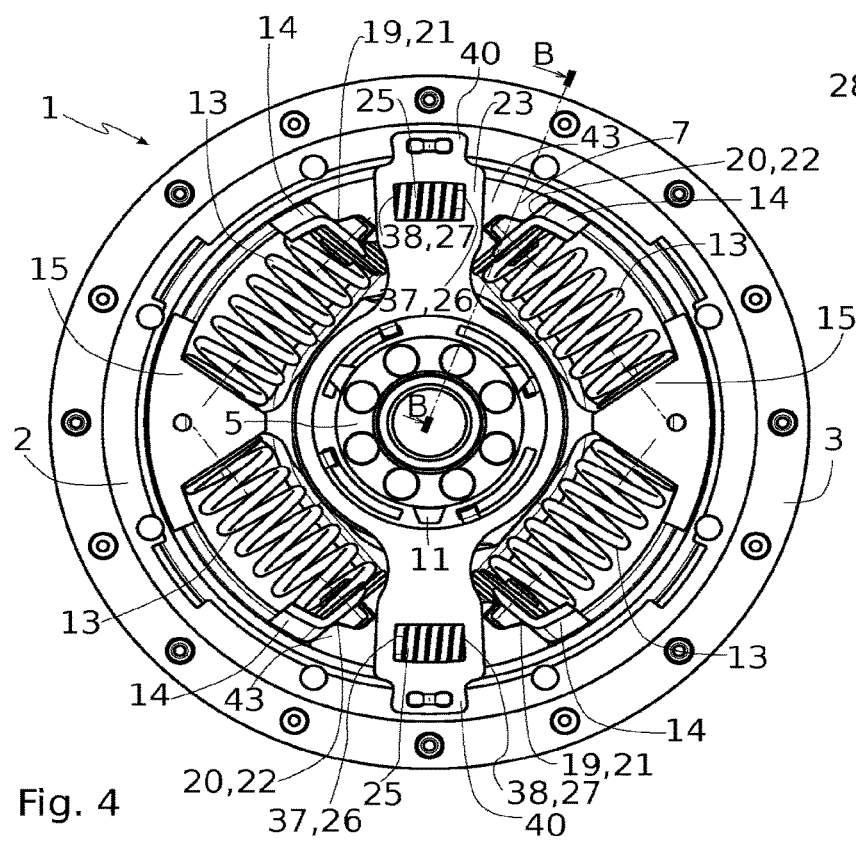
Fig. 4
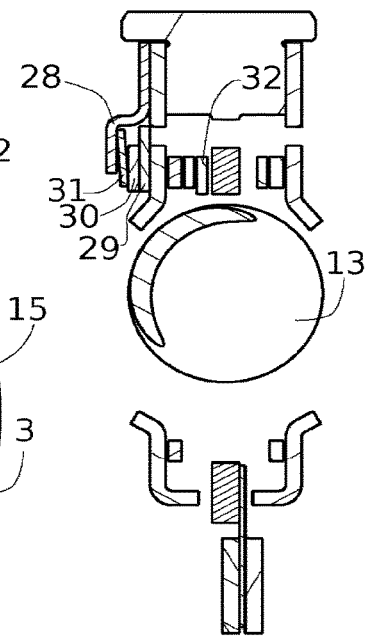
Fig. 3

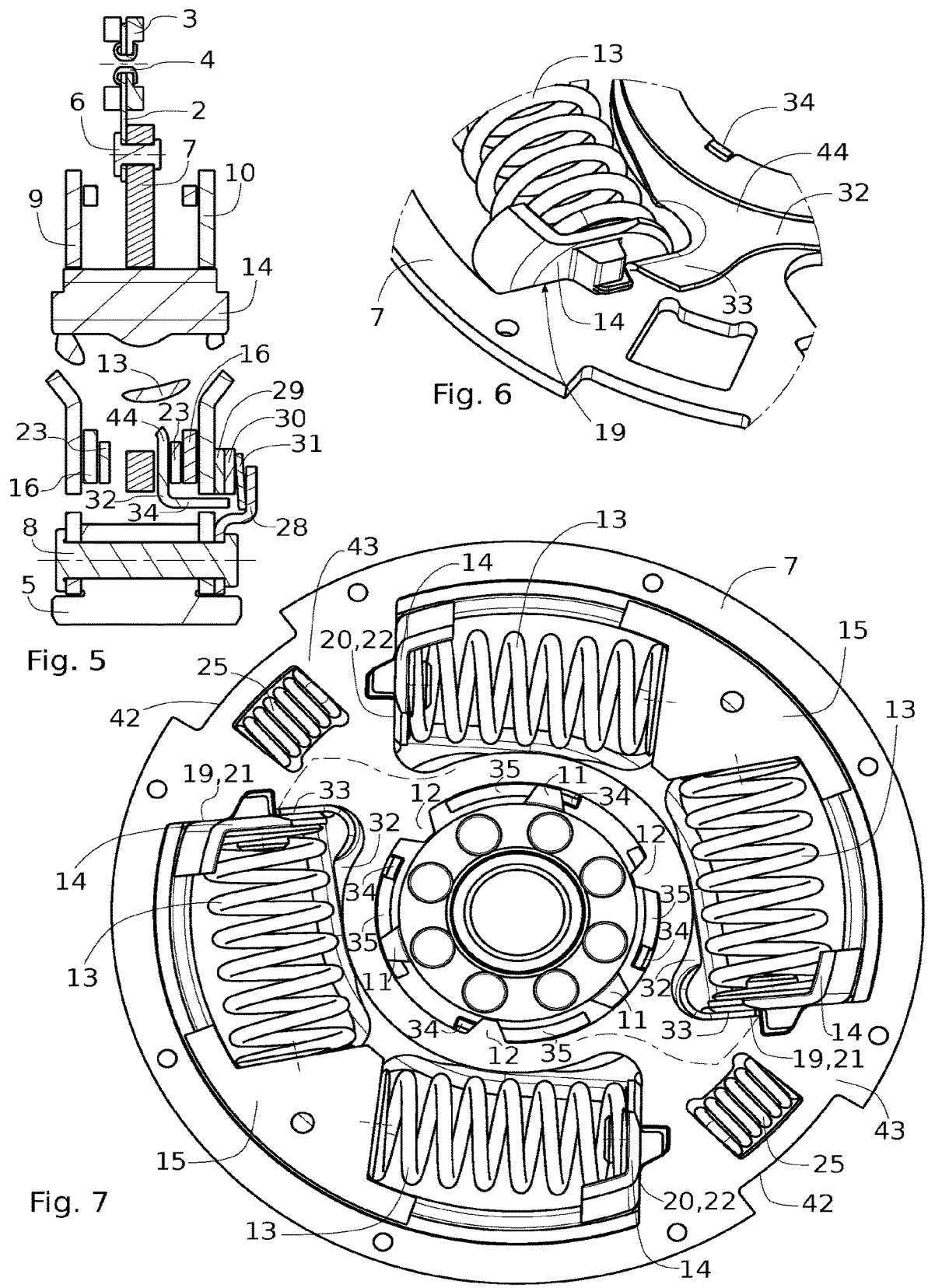

TORSION DAMPING DEVICE WITH ACTIVATABLE FRICTION DEVICE

BACKGROUND OF THE INVENTION

Field of the Invention

The invention relates to the field of the transmission of torque in motorized devices and relates to a torsion damping device for a vehicle drivetrain.

Description of the Related Art

Motorized vehicles generally comprise such torsion damping devices which may be incorporated into various elements of the drivetrain. For example, a dual-mas engine flywheel, a clutch disk, or a torque limiter, may include a torsion damping device making it possible to filter out acyclisms of the engine and other torsional oscillations. This filtering is typically performed by one or more torsion dampers which are spring-damper combinations working in torsion and allowing, during the transmission of the torque, a relative rotational movement of a first rotary torque-transmission element, coupled upstream of the drivetrain, and a second rotary torque-transmission element, coupled downstream of the drivetrain. The relative rotation may be permitted by springs and the damping may be achieved by a friction device provided with friction washers placed under axial load by elastic washers, so as by friction to dissipate some of the energy accumulated in the springs.

The friction device is tailored to each particular application, according to the amount of energy to be dissipated and to the phases of operation in which it is desirable for it to be active.

During the design of such a torsion damping device, particular attention is paid to the choice, size and layout of the elements of the friction device, in order to obtain a friction curve tailored to a particular application.

BRIEF SUMMARY OF THE INVENTION

It is an object of the invention to improve the torsion damping devices of the prior art by proposing such a device in which the friction device is active only during certain phases of operation.

To this end, the invention is aimed at a torsion damping device for a vehicle drivetrain, comprising:
- a first rotary torque-transmission element provided with a first housing;
- a second rotary torque-transmission element provided with a second housing;
- an elastic device interposed between the first rotary element and the second rotary element and, when it deforms, allowing relative rotation of the first and second rotary elements about an axis of rotation, the elastic device comprising at least one spring which is mounted both in the first housing and in the second housing;
- a friction device comprising:
  - a friction washer arranged to rub directly or indirectly against the second rotary element;
  - an axial support which in terms of rotation is solid with the second rotary element;
  - an elastic washer arranged between the axial support and the friction washer so as to exert an axial force on the friction washer in the direction of the second rotary element;
  - an actuating washer comprising an actuating tab arranged circumferentially between a first end of said spring and the first rotary element so as to allow relative rotation between the actuating washer and the second rotary element when the first end of the spring is moved by the first rotary element, via the actuating tab, in the direction of a second end of the spring that is opposite to the first end,
  - the actuating washer being able to drive the friction washer in rotation so that when the actuating washer and the second rotary element are rotating one with respect to the other, the friction washer rubs directly or indirectly against the second rotary element.

The torsion damping device may comprise the following additional features, alone or in combination:
- the actuating washer comprises at least one axial finger collaborating with a notch of the friction washer so as to allow the friction washer to be driven by the actuating washer;
- the actuating washer and the friction washer are mounted solidly in terms of rotation;
- the actuating washer comprises at least one axial finger coupled with a notch in the friction washer;
- if desired, a circumferential clearance is present between the axial finger and the circumferential ends of the notch of the friction washer. In this way, it is possible to delay the driving of the friction washer by the actuating washer. The circumferential clearance may represent 3 to 5 degrees;
- the actuating washer comprises an annular portion connecting the actuating tab and the axial finger, and the second rotary element comprises an annular friction surface against which the friction washer is pressed, the annular portion of the actuating washer, on the one hand, and the elastic washer, the axial support and the friction washer, on the other hand, being positioned on the one side and on the other side of the annular friction surface of the second rotary element;
- an axial clearance is left between the first rotary element and the annular portion of the actuating washer;
- the annular portion of the actuating washer is mounted between the first rotary element and the annular friction surface with an axial clearance that allows the actuating washer to rotate with respect to the first rotary element;
- the friction device is arranged in such a way that the washer presses the friction washer against the second rotary element without pressing the annular portion of the actuating washer firmly against the first rotary element. In this way a relative rotational movement between the first rotary element and the activation washer is permitted, so that the friction washer is not driven by the first rotary element when the second end of the spring is compressed by the first rotary element in the direction of the first end of the spring. In this way, the friction generated by the friction washer is obtained only for one direction of transmission of the torque, for example from the input shaft of the gearbox in the direction of the engine;
- the annular portion of the actuating washer may be mounted between the first rotary element and a third rotary torque-transmission element, mobile in rotation about the axis, also with an axial clearance that allows the actuating washer to rotate with respect to the first rotary element;
- the second rotary element comprises a slot via which axial finger passes through the second rotary element;

the axial support is formed of an annular flange secured to the second rotary element, the elastic washer and the friction washer being positioned between this annular flange and the annular friction surface of the second rotary element;

the friction device comprises an intermediary washer interposed between the elastic washer and the friction washer;

the axial finger is distant from the intermediary washer;

the annular portion of the actuating washer is arranged axially between the first rotary element and the second rotary element;

the elastic device comprises at least two groups of springs, the springs being arranged in series in each group by means of a phasing element connecting the ends of the springs within a group of springs;

of the first rotary element and the second rotary element, one is coupled in rotation with a torque input element and the other of these elements is coupled in rotation with a torque output element;

the actuating washer further comprises an angular stop and the second rotary element comprises a complementary stop, the angular stop and the complementary stop being arranged in such a way that the actuating washer is coupled in rotation with the second rotary element when the second rotary element compresses the first end of the spring in the direction of the second end of the spring opposite to the first end. In this way, by virtue of the stop, the friction generated by the friction washer is obtained only for one direction of transmission of the torque, for example from the input shaft of the gearbox in the direction of the engine, the stop preventing the activation washer from rotating with respect to the second rotary element in the other direction of transmission of the torque, for example from the engine to the input shaft of the gearbox;

an axial finger coupling the actuating washer and friction washer forms said angular stop and the slot forms said complementary stop;

the angular stop is arranged on the actuating tab of the actuating washer and the complementary stop is arranged on the second housing of the second rotary element so that the actuating tab is interposed circumferentially between the first end of the spring and a bearing face of the second housing;

in an angular position of rest adopted by the device when no torque is being transmitted, the at least one spring is mounted in said first and second housings in such a way that its ends bear simultaneously against, on the one hand, a first bearing zone of the first housing and, on the other hand, a second bearing zone of the second housing;

according to one embodiment, the elastic device comprises at least two springs, the spring collaborating with the actuating tab of the actuating washer being a spring with an offset action, a circumferential clearance being left between the actuating tab and the first end of the spring in the angular position of rest of the damping device. Thus, friction can be obtained with a "delayed effect".

According to one embodiment, the elastic device comprises four springs and the actuating washer comprises two actuating tabs and two springs each collaborate with one actuating tab of the actuating washer, these two springs being a spring with an offset action, a circumferential clearance being left between each actuating tab and the first end of each spring with an offset action in the angular position of rest of the damping device.

Another subject of the invention is a torsion damping device for a vehicle drivetrain, comprising:

a first rotary torque-transmission element;

a second rotary torque-transmission element;

a main damper comprising at least one main spring interposed between the first rotary element and the second rotary element and, as it deforms, allowing relative rotation of the first and second rotary elements about an axis of rotation.

The torsion damping device further comprises:

a third rotary torque-transmission element mounted with the ability to rotate with respect to the first and second rotary elements about said axis of rotation;

an additional damper comprising at least one additional spring mounted both in the first rotary element and in the third rotary element;

the second and third rotary elements respectively comprising a first stop and a complementary second stop, these stops being arranged in such way that: when the angular travel between the first and second rotary elements is greater than zero and below a threshold for the angular travel between the first and second rotary elements from a relative angular position of rest of the first and second rotary elements for which no torque is transmitted, said at least one main spring is compressed whereas the third rotary element is coupled in rotation with the first rotary element via the non-compressed additional spring; and when the angular travel between the first and second rotary elements is above said threshold, the first stop and the complementary second stop are pressed against one another, the at least one main spring being compressed and the at least one additional spring being compressed in parallel between the first rotary element and the third rotary element.

In the description and the claims, the terms "compressed" or "compression", on the one hand, and "preload" or "preloaded" on the other hand, when referring to the springs, are used as follows:

the preload of a spring refers to the fact that this spring is mounted in one or several housings which are smaller than the initial length of the spring, the latter therefore, on account of its elasticity, exerting a force against the walls of the housings;

the compression of a spring refers to the fact that this spring is compressed by the action of moving two moving parts closer together.

The preload of a spring is therefore effective even when the torsion damping device is at rest, without any load being transmitted. The compressing of a spring does not itself occur except when, during the transmission of torque, parts capable of moving relative to one another alter the configuration of the housings of the spring and compress same.

A torsion damping device according to the invention has, for a relative rotation of the first and second rotary elements from an angular position of rest of the dampers for which no torque is transmitted into an end-of-travel position of the dampers, two phases of operation:

a first phase of operation for which the angular travel between the first rotary element and the second rotary element is below said threshold, the main damper being arranged so as to be deformed during this first phase while the third rotary element is able to be driven in rotation by the first rotary element, without deformation of the additional spring, via the additional spring; and a second phase of operation for which the torque transmitted is enough for the angular travel between the first rotary element and the second rotary element to be greater than said threshold, the deformation of the main damper continuing during this second phase while the relative rotation between the third rotary element and the second rotary element is prevented by the first stop bearing against the complementary second stop so that the torque transmitted also allows the additional spring to be deformed and allows relative rotation between, on the one hand, the first transmission element and, on the other hand, the second and third rotary elements.

An increase in the stiffness of the damping device is thus obtained in a way that is reliable and stable during the second phase of operation in which the main damper and the additional damper are working simultaneously, whereas only the main damper works during the first phase of operation.

Such a device advantageously replaces an end-of-travel stop between the first and second rotary elements, thereby avoiding any mechanical shock and associated vibrations.

This second phase of operation is particularly advantageous in the case of a main damper with a large travel, for example having more than 30 degrees of angular damping travel.

The torsion damping device may comprise the following additional features, alone or in combination:

- the first rotary element comprises at least one first additional housing and in that the third rotary element comprises at least a second additional housing, the at least one first and second additional housings being arranged axially facing one another so that the at least one additional spring is inserted in these mutually-facing housings;
- the first rotary element comprises at least one arm extending radially and arranged circumferentially between two main springs, one of said first additional housings being formed on this arm;
- the first rotary element comprises at least one arm extending radially, a main spring bearing circumferentially directly or indirectly against this arm, a second additional housing being formed on this arm;
- the at least one main spring and the at least one additional spring are arranged in such a way that at least a portion of the additional spring lies radially in a same plane perpendicular to said axis as a portion of the main spring. The additional additional spring lies overall radially in a same plane perpendicular to said axis as a portion of the main spring;
- the at least one main spring comprises an external radial edge and an internal radial edge and the at least one additional spring is arranged at least in part in a torus centered on said axis and radially delimited by the internal and external radial edges of the at least one main spring;
- the main damper comprises at least two main springs and an additional spring is arranged circumferentially between two main springs;
- the main damper comprises at least two groups of main springs, the main springs being arranged in series within each group, and an additional spring is arranged circumferentially between two groups of main springs;
- the main springs are arranged in series within each group by means of a phasing element, which within each group connects two consecutive main springs arranged in series;
- said threshold is comprised between 15 and 65 degrees, preferably between 25 and 50 degrees;
- the device comprises an end-of-travel angular stop limiting the relative angular travel of the first and second rotary elements, and in that the angle separating said threshold from the end-of-travel angular position is comprised between 3 and 15 degrees, preferably between 3 and 10 degrees;
- the ratio of the stiffness of the additional damper to the stiffness of the main damper is comprised between 2 and 10, preferably between 3 and 8, for example 4 or 5. For example, the angular stiffness of the main damper is around 3 Nm/° and the angular stiffness of the additional damper is comprised between 12 Nm/° and 15 Nm/°, for example 14 Nm/°;
- of the first rotary element and the second rotary element, one is coupled in rotation to a friction disk and of the first rotary element and the second rotary element the other is coupled in terms of rotation to a hub;
- the third rotary element comprises two additional guide washers arranged one on each side of the first rotary element and axially holding the additional springs, and the second rotary element comprises two main guide washers axially holding the main springs, each additional guide washer being arranged axially between the first rotary element and a main guide washer;
- said second stop is formed by at least one radial tongue arranged on each additional guide washer;
- said first and second complementary stops are arranged radially on the outside of the main springs.

BRIEF DESCRIPTION OF THE SEVERAL VIEWS OF THE DRAWINGS

One preferred embodiment of the invention will now be described with reference to the attached drawings in which:

FIG. 2 is a face-on view of the torque limiter of FIG. 1;

FIG. 3 is a view in section on A-A of FIG. 2;

FIG. 4 is a view similar to FIG. 2, showing the inside of the torque limiter;

FIG. 5 is a view in section on B-B of FIG. 4;

FIG. 6 is a detailed perspective view of the torsion damping device of the preceding figures;

FIG. 7 is a face-on view of the torsion damping device of the preceding figures, in the rest position;

DETAILED DESCRIPTION OF THE INVENTION

Figure 1:
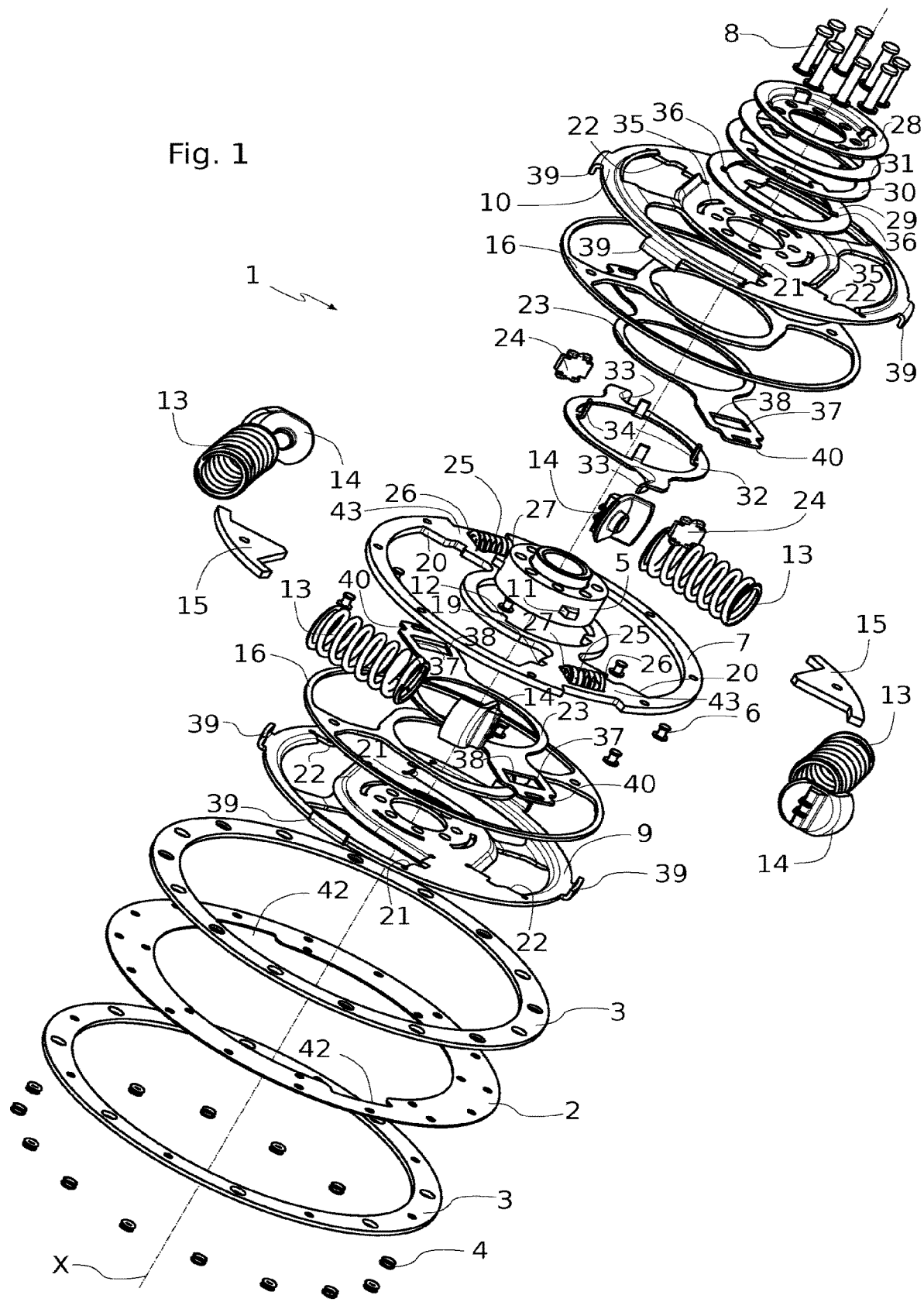
FIG. 1 is an exploded view of a torsion damping device comprising a torsion damping device according to the invention.

FIG. 1 depicts a torsion damping device coupled to a friction disk 2 of a torque limiter (not depicted in FIG. 1) intended, in normal operation, to transmit torque by rotating about an axis X and to limit this transmission when this torque exceeds a certain value.

In the description and the claims, the terms "external" and "internal" and the orientations "axial" and "radial" will be used to refer, according to the definitions given in the description, to elements of the damping device. The axis X of rotation determines the "axial" orientation. The "radial" orientation is directed orthogonally to the axis X. The "circumferential" orientation is directed orthogonally to the axis X of rotation and orthogonally to the radial direction. The terms "external" and "internal" are used to define the relative position of one component with respect to another, with reference to the axis X of rotation, a component close to said axis is thus qualified as internal as opposed to an external component which is situated radially at the periphery. Furthermore, the angles and angular sectors referred to are defined in relation to the axis of rotation X.

The damping device 1 comprises:
- a peripheral torque-transmission member here consisting of a friction disk 2 with two friction linings 3 fixed on either side of it using a first set of rivets 4;
- a central torque-transmission member here consisting of a hub 5.

The friction disk 2 is fixed by a second set of rivets 6 to a first rotary torque-transmission element which here consists of a disk referred to as "web" 7.

The hub 5 is fixed by a third set of rivets 8 to a second rotary torque-transmission element which here consists of a pair of disks referred to as "guide washers" 9, 10. A first guide washer 9 is fixed against one flank of the hub 5 while a second guide washer 9 is fixed against an opposite flank of the hub 5. The guide washers 9, 10 each comprise four angular stops 39 arranged on the periphery of the washer on two perpendicular diameters, the four angular stops 39 of each guide washer 9, 10 being arranged facing the four angular stops 39 of the other guide washer 9, 10. The angular stops 39 are created by bending the material of the guide washers 9, 10.

The damping device comprises a torsion damping device interposed between the web 7 and the guide washers 9, 10 so that the web 7 on the one hand, and the guide washers 9, 10 on the other, can rotate relative to one another, compressing the damping device.

The damping device 1 is intended to be mounted in a torque-transmission drivetrain, for example between an engine and the wheels of a vehicle, so that the friction disk 2 and its linings 3 are pressed by means of an elastically loaded pressure disk, against a bearing disk mounted solid with an engine flywheel; and so that the hub 5 is connected to a transmission shaft. The drive element drives the rotation of the friction linings 3 and therefore the web 7 secured thereto. The web 7 compresses the damping device which transmits the torque to the guide washers 9, 10 and therefore to the hub 5 secured thereto. By transmitting the torque between the web 7 and the guide washers 9, 10, the damping device, through its elastic and friction properties, filters out as they pass acyclisms and other undesirable torsional movements.

The damping device 1 additionally comprises a first end-of-travel stop and a complementary second end-of-travel stop allowing the torque to be transmitted directly from the friction linings 3 to the hub 5, bypassing the torsion damping device beyond a predetermined angle of relative rotation between the web 7 and the guide washers 9, 10.

The first end-of-travel stop here consists of external teeth 11 arranged on the periphery of the hub 5 and the complementary second end-of-travel stop here consists of internal teeth 12 at the center of the web 7.

The torsion damping device comprises a main damper and an additional damper.

The main damper comprises:
- four springs 13 arranged circumferentially;
- four end-pieces 14 for mounting these springs 13;
- an element for phasing the springs 13, which consists of two inserts 15 mounted, diametrically opposite, between two phasing disks 16;

The web 7 and the guide washers 9, 10 each comprise openings for the mounting of the springs 13, defining two housings, each for one pair of springs 13. The housings in the web 7 each have a first bearing zone 19 and an opposite second bearing zone 20. Likewise, the housings in each guide washer 9, 10 each have a first bearing zone 21 and an opposite second bearing zone 20.

The damping device additionally comprises a third rotary torque-transmission element which, in the present example, is made up of two identical additional guide washers 23 mounted one on each side of the web 7 and secured by two spacers 24.

The additional damper comprises two additional springs 25 each placed in an additional housing of the web 7. The web 7 for this purpose comprises two diametrically opposite arms 43 each bearing one of these housings. The main springs 13 are mounted between the arms 43. The additional guide washers 23 also comprise housings for the mounting of the additional springs 25. For the mounting of the additional springs 25, the additional housings of the web 7 each comprise a first additional bearing zone 26 and a second additional bearing zone 27, and the housings of the additional guide washers 23 each comprise a first additional bearing zone 37 and a second additional bearing zone 38.

The damping device 1 also comprises a friction device intended to dissipate the energy of the springs and prevent oscillatory phenomena. The friction device comprises an axial support 28 fixed against the second guide washer 10 by the third set of rivets 8. Between the axial support 28 and the second guide washer 10 there are positioned: a friction washer 29; an intermediary washer 30; and an elastic washer 31, the latter applying load to the friction washer 29 via the intermediary washer 30.

In addition, an actuating washer 32 is provided on the other side of the second guide washer 10 and comprises two actuating tabs 33 and four axial fingers 34. The actuating washer 32 is mounted in such a way that the four axial fingers 34 pass through four corresponding slots 35 made in the second guide washer 10. The four axial fingers 34 each become inserted in a notch 36 of the friction washer 29. The actuating washer 32 is thus coupled in terms of rotation to the friction washer 29. The actuating washer 32 is also mounted against the web 7 so that the actuating tabs 33 each come to bear on one of the bearing zones 19 of the web 7.

The mounting of the main springs 13 is shown in the face-on view of FIG. 2. The straight diameter of the disk 1 comprises a first pair of main springs 13 mounted in series, and the straight diameter of the figure comprises a second pair of main springs 13 mounted in series. This FIG. 2 shows the disk 1 in the state of rest, namely when it is not transmitting a torque, no demand being placed on its springs. Each spring 13 is mounted, at one of its ends, in an end piece 14 and, at the other of its ends, against an insert 15. Each end piece 14 is pressed straddling the web 7 and the two guide washers 9, 10 and therefore bears against three bearing zones: one bearing zone on the web 7 and one bearing zone on each guide washer 9, 10. Thus, each pair of springs 13 is mounted between two end pieces 14 one of which bears simultaneously against the first bearing zone 19 of the web 7 and against the first bearing zone 21 of each guide washer 9, 10, and the other end piece 14 bears simultaneously on the second bearing zone 20 of the web 7 and on the second bearing zone 22 of each guide washer 9, 10. The springs 13 are thus, in pairs, preloaded between the first bearing zones 19, 21 and the second bearing zones 20, 22. Between the springs 13 of each pair, the insert 15, mobile in rotation about the axis X by virtue of the phasing disks, brings the springs 13 of a pair into series and provides the phasing, namely the angular coordination, of one pair with the other.

The view in cross section of FIG. 3 shows the stack of components within the damping device 1.

The two additional guide washers 23 are positioned one on each side of the web 7, the actuating washer 32 being positioned between the web 7 and one of these additional guide washers 23.

The phasing disks 16 are arranged one on each side of the two additional guide washers 23, while the two guide washers 9, 10 are positioned one on each side of the assembly. Only the friction device is situated axially on the outside of the guide washers 9, 10, via the axial support 28.

FIG. 4 depicts the disk 1 of FIG. 2 without the first guide washer 9, revealing the arrangement of the springs 13, 25, of the web 7, and of the additional damper 25.

The additional springs 25 are mounted in a similar way to the main springs 13, straddling the web 7 and the additional guide washers 23. Each additional spring 25 is thus preloaded between, on the one hand, a bearing simultaneously on the first additional bearing zone 26 of the web 7 and on the two first additional bearing zones 37 of the two additional guide washers 23 and, on the other hand, a bearing simultaneously against the second additional bearing zone 27 of the web 7 and against the two second additional bearing zones 38 of the two additional guide washers 23.

In addition, the dimension, in the radial direction, of the housings of the additional guide washers 23 is slightly smaller that of the additional housings on the web 7 so that an additional spring 25 is mounted straddling the web 7 and is contained on each side of the web 7 by the additional guide washers 23.

The additional guide washers 23 on their radial ends comprise tongues 40 to which the spacers 24 are fixed.

With reference to FIGS. 1 and 4, the friction disk 2 comprises two diametrically opposed cutouts 41 and the web 7 comprises two diametrically opposed cutouts 42, the cutouts 41, 42 facing one another. These cutouts 41, 42 allow relative rotation of the additional guide washers 23 and of the web 7, by the angular travel permitted by the additional springs 25.

FIG. 5 is a view in section on B-B of FIG. 4 and specifically shows the arrangement of the friction device. This section renders visible an axial finger 34 of the actuating washer 32 which passes through the guide washer 10 at the slot 35.

The actuating washer 32 comprises an annular portion 44 connecting the radial fingers 34 and the actuating tabs 33 (which are not visible in the cross section of FIG. 5). The annular portion 44 of the actuating washer is positioned between the web 7 and one of the additional guide washers 23. The axial space between the web 7 and the additional guide washer 23 is greater than the thickness of said annular portion 44 so that the actuating washer is mounted with axial clearance 47 between it and the web 9. A rotation of the web 9 will therefore not cause the actuating washer 32 to rotate by friction.

The axial support 28 has the shape of an annular collar secured to the guide washer 10 by the set of rivets 8.

FIG. 6 is a perspective view of a portion of the web 7 and illustrates the positioning of the actuating washer 32 with respect to a main spring 13. The actuating washer 32 is effectively mounted in such a way that the actuating tab 33 is inserted between one end of the spring 13 and a first bearing zone 19 of the web 9. The actuating tab 33 can be inserted directly between these two components 13, 9 or inserted via other components. In this example, the actuating tab 33 is inserted between the end piece 14, fixed to the end of the spring 13, and the first bearing zone 19 of the web 9. In this position of FIG. 6, the compression of the spring 13 blocks the actuating washer 32 against the web 9.

FIG. 7 depicts the torsion damping device 1 without, for the sake of simplifying the figure, the additional guide washers 23, the disks 2, 3 and the first guide washer 9. The web 7 is therefore visible in the foreground with the main springs 13 and the additional springs 25 mounted in their respective housings. Behind the web 9 can be found, in this order, the actuating washer 32, the additional guide washer 23, a phasing disk 16, the second guide washer 10 and the friction device.

In FIG. 7, the annular portion of the actuating washer 32 is hidden by the web 9 but the two actuating tabs 33 are visible, inserted between the first bearing zones 19 of the web 9 and the end of the springs 13, via the end pieces 14. The portions of the actuating tabs 33 which are hidden by the web 9 are depicted in dotted line.

In this position of FIG. 7, the torsion damping device 1 is in an angular position of rest for which no torque is transmitted and in which, therefore, no demand is placed on the springs 13, 25. This angular position of rest is the initial position from which the following are characterized:
  a first polarity of torque defined by the fact that the web 7 is in an angular position, with respect to the guide washers 9, 10, which is situated in an angular sector comprised between the angular position of rest and an end-of-travel position in which the web 7 has rotated as far as possible in the counterclockwise direction until the teeth 11, 12 come into abutment;
  a second polarity of torque defined by the fact that the web 7 is in an angular position, with respect to the guide washers 9, 10, which is situated in an angular sector comprised between the angular position of rest and an end-of-travel position in which the web 7 has rotated as far as possible in the clockwise direction, until the teeth 11, 12 have come into abutment.

These two polarities of torque correspond to two modes of operation of the torsion damping device 1:
  a mode in which the torque is transmitted from the central torque-transmission element toward the peripheral torque-transmission element, corresponding for example, in a vehicle, to a transmission of torque from the wheels toward the engine (engine-breaking phases for example), commonly referred to as "retro mode";
  a mode in which the torque is transmitted from the peripheral torque-transmission element toward the central torque-transmission element, corresponding, for example, in a vehicle, to a transmission of torque from the engine toward the wheels (acceleration phases for example) commonly referred to as "direct mode".

The operation of the friction device differs according to whether the torsion damping device 1 is operating with one of these polarities of torque or the other.

Figure 8:
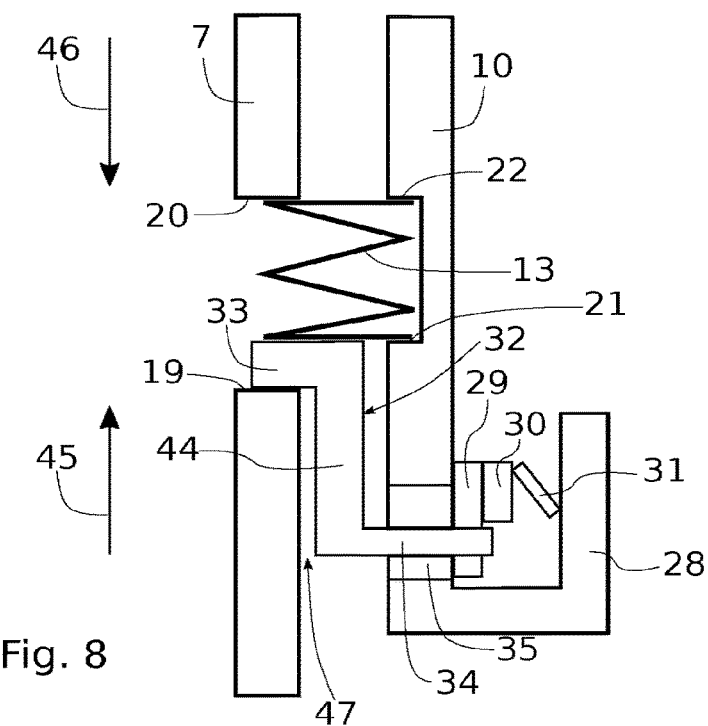
FIG. 8 is a schematic diagram of the operation of the torsion damping device of the preceding figures.

FIG. 8 is a schematic diagram illustrating the operation of the friction device of the torsion damping device 1. The component numbering in this figure reflects that of the elements it is schematically representing. The web 7 and the second guide washer 10, are thus represented by two vertical components facing one another. The relative rotation between the web 7 and the guide washers 9, 10 is indicated schematically in this drawing by a relative movement of the components 7, 10 along a vertical axis.

The web 7 comprises a housing for the main spring 13, provided with a first bearing zone 19 and with a second bearing zone 20. Likewise, the guide washer 10 comprises a housing for the same main spring 13, provided with a first bearing zone 21 and with a second bearing zone 22. An actuating tab 33 of an actuating washer 32 is clamped between the spring 13 and the first bearing zone 19 of the web 7. The axial finger 34 connects the actuating washer 32 and the friction washer 29 which is positioned against the intermediary washer 30 elastically loaded by the elastic washer 31.

When the torsion damping device has demand placed on it by the first polarity of torque, this is equivalent, in the schematic diagram of FIG. 8, to a movement of the web 7 in the direction of the arrow 45, with the guide washer 10 remaining stationary. The web 7 therefore, via its first bearing zone 19, drives the actuating tab 33 and compresses the spring 13 against the second bearing zone 22 of the guide washer 10. The main damper is therefore in service, through the compression of the springs 13, as to is the friction device because the movement of the actuating tab 33 causes the friction washer 29 to move and therefore rub against the guide washer 10 and the intermediary washer 30.

By contrast, when the torsion damping device has demand placed upon it with torque of the second polarity, that is equivalent to a movement of the web 7 in the direction of the arrow 46, with the guide washer 10 remaining stationary. The web 7 therefore, via its second bearing zone 20, compresses the spring 13. The main damper is then in service, through the compression of the springs 13, but the friction device for its part is not in service because the actuating tab 33 is not driven. The spring is effectively compressed between the second bearing zone 20 of the web 7 and the first bearing zone 21 of the guide washer 10. The first bearing zone 19 of the web therefore moves away from the actuating tab 33 of the actuating washer 32. Because the actuating washer 32 is not driven, it remains in place because of the clamping of the friction washer 29 which holds it via the axial finger 34. The clearance 47 present between the annular portion of the actuating washer 32 and the web 7 allows the actuating washer 32 not to be driven by friction by the movement of the web 9.

With the first polarity of torque, the friction device is thus activated, whereas it is not activated with the second polarity of torque.

Figure 9:
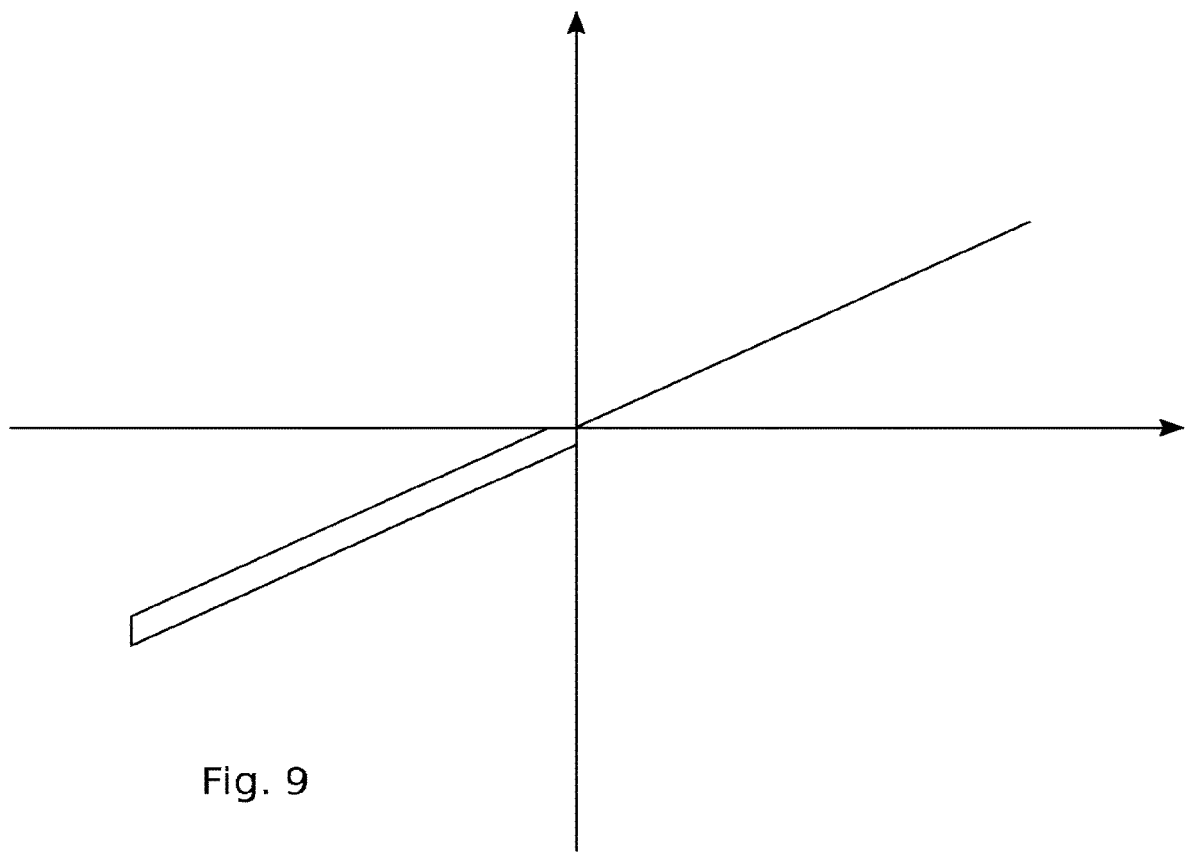
FIG. 9 is a characteristic curve of the operation corresponding to the diagram of FIG. 8.

FIG. 9 illustrates how the return torque (on the ordinate axis) exerted by the torsion damping device evolves as a function of the angle of relative rotation (on the abscissa axis) between the web 7 and the guide washers 9, 10. The curve in the lower left quadrant of the figure represents how the return torque evolves when the torsion damping device is working with the first polarity of torque, and the curve in the upper right quadrant represents how the torque evolves when the torsion damping device is working with the second polarity of torque. The origin for the frame of reference corresponds to the angular position of rest of FIG. 7.

With the first polarity of torque (lower left quadrant), the friction device is active and the curve in FIG. 9 adopts substantially the form of two parallel straight lines. The gradient of the straight lines is indicative of the stiffness of the springs 13. The fact that there are two straight lines illustrates the dissipation of energy during the outbound movement (from the angular position of rest toward the end-of-travel position) and during the return movement (from the end-of-travel position toward the angular position of rest), this dissipation of energy being brought about by the friction device which is therefore activated.

With the second polarity of torque (upper right quadrant), the friction device is inactive and the curve therefore adopts substantially the form of a single straight line because, without any dissipation of energy through friction, the curve is identical for the outbound movement (from the angular position of rest toward the end-of-travel position) and for the return movement (from the end-of-travel position toward the angular position of rest).

Figure 10:
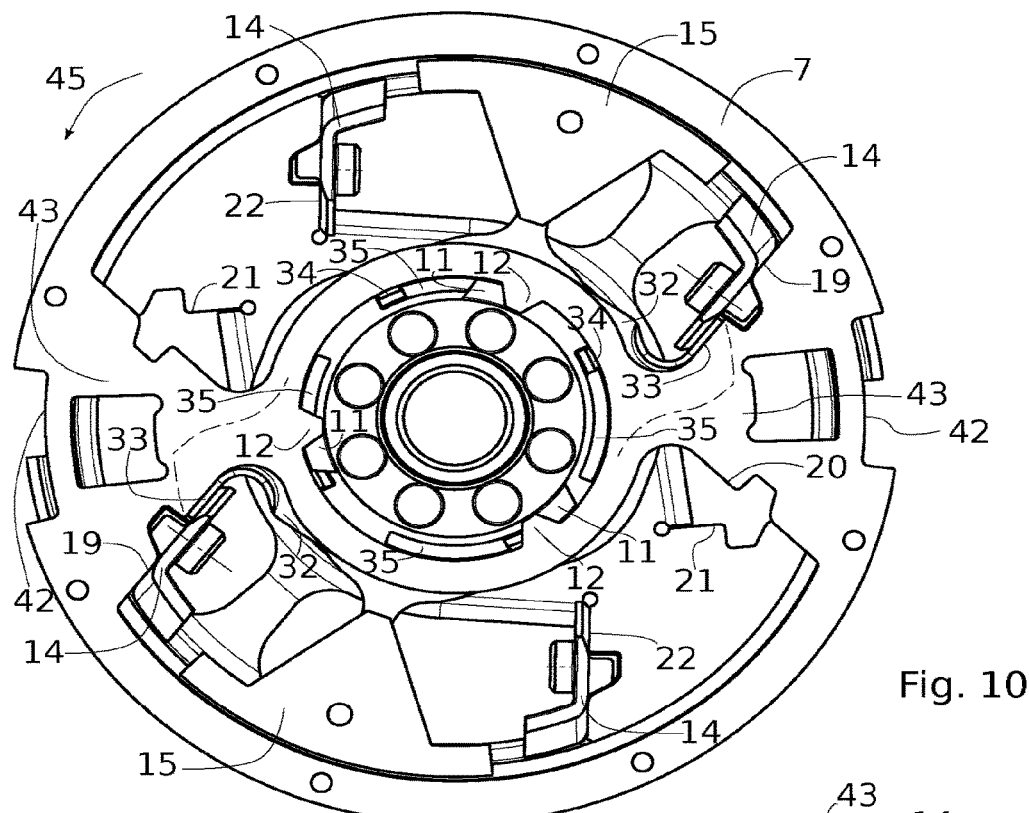
FIG. 10 is a view similar to FIG. 7 but in an end-of-travel position for a first polarity of torque.
Figure 11:
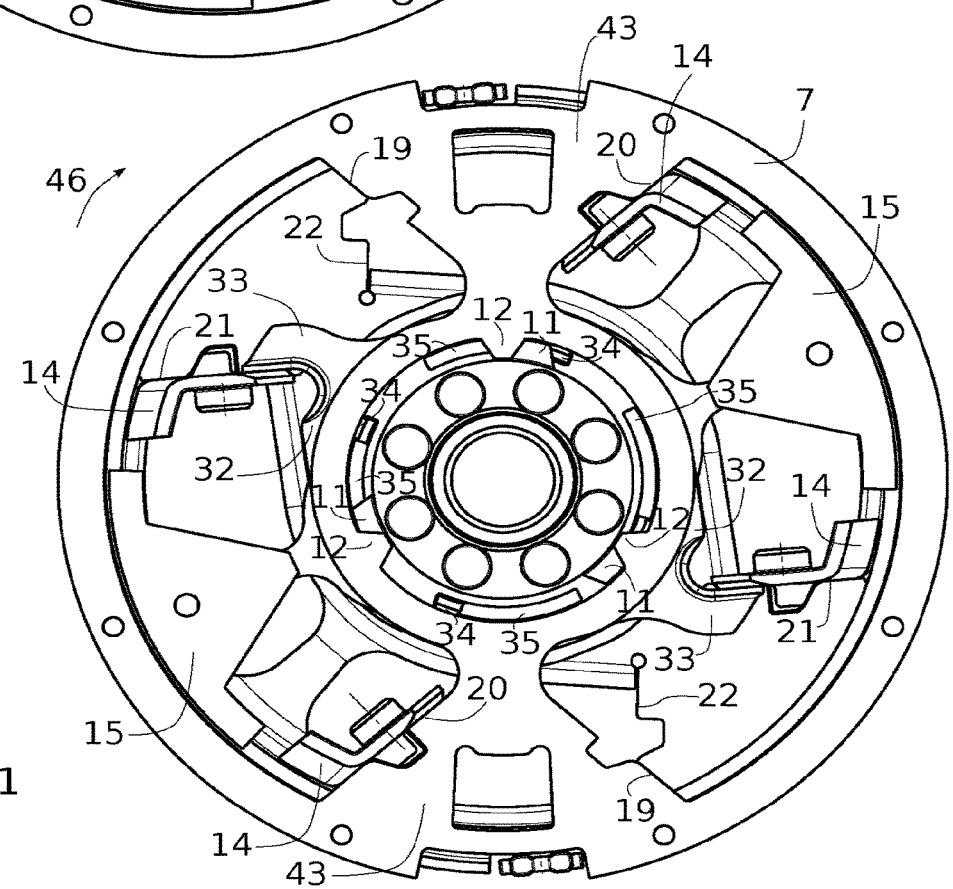
FIG. 11 is a view similar to FIG. 7 but in an end-of-travel position for a second polarity of torque.

FIGS. 10 and 11 illustrate the concrete application, within the torsion damping device 1, of the principles that have just been set out. These figures are missing certain elements, like FIG. 7, and also springs, for the sake of better clarity.

FIG. 10 relates to the disk 1 with the first polarity of torque. By comparison with the angular position of rest of FIG. 7, the web 7 has rotated in the counterclockwise direction as far as its end-of-travel position (arrow 45). In this position, the main springs 13 are compressed between the first bearing zones 19 of the web 7 and the second bearing zones 22 of the guide washers 9, 10. The actuating tabs 33 of the actuating washers 32 are driven with the web 7 in this rotation via the first bearing zones 19. That portion of the actuating tab 33 that is hidden by the web 7 is indicated in dotted line.

As a result, when the torsion damping device 1 is operating in the angular sector relating to the first polarity of torque, the actuating washer 32 is driven in rotation, causing the friction washer 29 to rub and therefore activation of the friction device.

FIG. 11 relates to the disk 1 with the second polarity of torque. By comparison with the angular position of rest of FIG. 7, the web 7 has now rotated in the clockwise direction as far as its end-of-travel position (arrow 46). In this position, the main springs 13 are compressed between the second bearing zones 20 of the web 7 and the first bearing zones 21 of the guide washers 9, 10. The first bearing zones 19 of the web 7 move away from the actuating tabs 33 and the actuating washer 32 is therefore not driven in rotation.

As a result, when the torsion damping device 1 is operating in the relative angular sector of the second polarity of torque, the actuating tab 33 remains in place and the actuating washer 32 is not driven in rotation, so the friction device is not activated.

Figure 12:
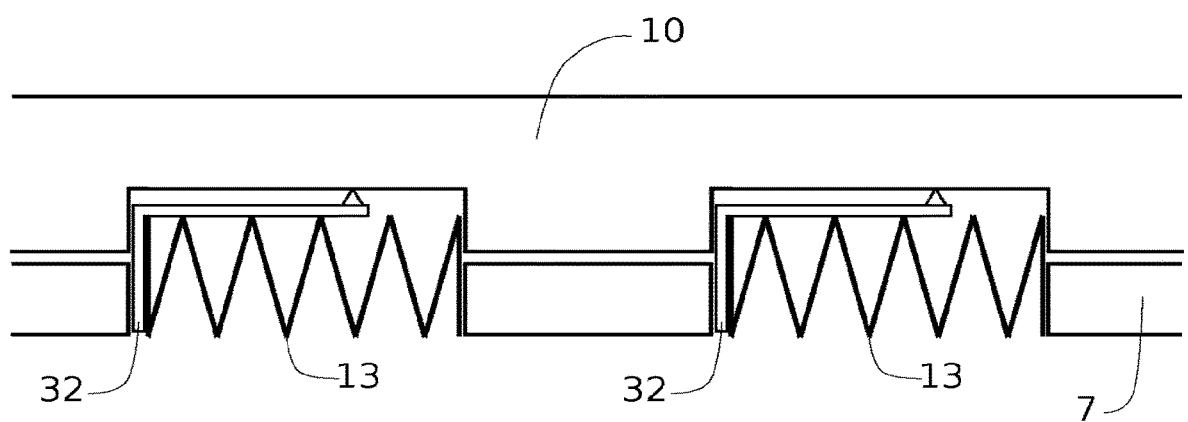
FIG. 12 is a schematic diagram of a variant of the invention.

FIG. 12 relates to a variant of the torsion damping device that has just been described. This schematic diagram depicts a damping device viewed edge-on and shows the collaboration between a guide washer 10 and a web 7 and two main springs 13 each collaborating with an actuating washer 32.

In this variant, the actuating tab 33 of each actuating washer 32 positions itself not only between the spring 13 and the web 7 but also between the spring 13 and the guide washer 10. Furthermore, in this variant, the actuating washers 32 rub directly on the guide washer 10.

According to the invention, the torsion damping device according to this variant allows the actuating washer 32 to be driven, and therefore cause friction, during operation with a first polarity of torque, and allows this washer not to be driven during operation with the opposite polarity of torque. Other embodiment variants of the torsion damping device may be implemented without departing from the scope of the invention. For example, the system in which the torsion damping device is mounted may be any system within a torque-transmitting drivetrain that requires the damping of torsion, such as a clutch disk or a dual-mass flywheel.

The functions of the main damper and of the secondary damper may be afforded by one single spring or by any number of springs, potentially in series or in parallel.

The stop for the additional guide washers on the second rotary element may be achieved in a different way, for example using other stops arranged near the center of the disk.

The roles of the web and of the guide washers may be reversed, the web becoming the second rotary element and the guide washers becoming the first rotary element.

As a variant, the actuating tab 33 of the actuating washer 32 may also be mounted straddling the web 7 and the guide washer 9.

The axial support 28 may equally be made as one piece with the guide washer 10.

The invention claimed is:

1. A torsion damping device for a vehicle drivetrain, comprising:
    a first rotary torque-transmission element provided with a first housing;
    a second rotary torque-transmission element provided with a second housing;
    an elastic device interposed between the first rotary element and the second rotary element and, when the elastic device deforms, allowing relative rotation of the first and second rotary elements about an axis of rotation, the elastic device comprising at least one spring which is mounted both in the first housing and in the second housing;
    a friction device comprising:
        a friction washer arranged to rub directly or indirectly against the second rotary element;
        an axial support which in terms of rotation is solid with the second rotary element;
        an elastic washer arranged between the axial support and the friction washer so as to exert an axial force on the friction washer in the direction of the second rotary element; and
        an actuating washer comprising an actuating tab arranged circumferentially between a first end of said spring and the first rotary element so as to allow relative rotation between the actuating washer and the second rotary element when the first end of the spring is moved by the first rotary element, via the actuating tab, in the direction of a second end of the spring that is opposite to the first end,
        the actuating washer being able to drive the friction washer in rotation so that when the actuating washer and the second rotary element are rotating one with respect to the other, the friction washer rubs directly or indirectly against the second rotary element,
    wherein the friction device comprises an intermediary washer interposed between the elastic washer and the friction washer.

2. The device as claimed in claim 1, wherein the actuating washer comprises at least one axial finger collaborating with a notch of the friction washer so as to allow the friction washer to be driven by the actuating washer.

3. The device as claimed in claim 2, wherein the actuating washer comprises an annular portion connecting the actuating tab and the axial finger, and the second rotary element comprises an annular friction surface against which the friction washer is pressed, the annular portion of the actuating washer, and the elastic washer, the axial support and the friction washer, being positioned on the one side and on the other side of the annular friction surface of the second rotary element.

4. The device as claimed in claim 3, wherein the annular portion of the actuating washer is mounted between the first rotary element and the annular friction surface with an axial clearance that allows the actuating washer to rotate with respect to the first rotary element.

5. The device as claimed in claim 3, wherein the second rotary element comprises a slot via which axial finger passes through the second rotary element.

6. The device as claimed in claim 3, wherein the axial support is formed of an annular flange secured to the second rotary element, the elastic washer and the friction washer being positioned between the annular flange and the annular friction surface of the second rotary element.

7. The device as claimed in claim 3, wherein the annular portion of the actuating washer is arranged axially between the first rotary element and the second rotary element.

8. The device as claimed in claim 1, wherein the elastic device comprises at least two groups of springs, the springs being arranged in series in each group by a phasing element connecting the ends of the springs within a group of springs.

9. The device as claimed in claim 1, wherein, of the first rotary element and the second rotary element, one is coupled in rotation with a torque input element and the other of these elements is coupled in rotation with a torque output element.

10. The device as claimed in claim 1, wherein the actuating washer further comprises an angular stop and the second rotary element comprises a complementary stop, the angular stop and the complementary stop being arranged in such a way that the actuating washer is coupled in rotation with the second rotary element when the second rotary element compresses the first end of the spring in the direction of the second end of the spring opposite to the first end.

11. The device as claimed in claim 10, wherein an axial finger coupling the actuating washer and friction washer forms said angular stop and the slot forms said complementary stop.

12. The device as claimed in claim 10, wherein the angular stop is arranged on the actuating tab of the actuating washer and the complementary stop is arranged on the second housing of the second rotary element so that the actuating tab is interposed circumferentially between the first end of the spring and a bearing face of the second housing.

13. The device as claimed in claim 1, wherein, in an angular position of rest adopted by the device when no torque is being transmitted, the at least one spring is mounted in said first and second housings in such a way that its ends bear simultaneously against a first bearing zone of the first housing and a second bearing zone of the second housing.

14. A torsion damping device for a vehicle drivetrain, comprising:
    a first rotary torque-transmission element provided with a first housing;
    a second rotary torque-transmission element provided with a second housing;
    an elastic device interposed between the first rotary element and the second rotary element and, when the elastic device deforms, allowing relative rotation of the first and second rotary elements about an axis of rotation, the elastic device comprising at least one spring which is mounted both in the first housing and in the second housing;
    a friction device comprising:

a friction washer arranged to rub directly or indirectly against the second rotary element;

an axial support which in terms of rotation is solid with the second rotary element;

an elastic washer arranged between the axial support and the friction washer so as to exert an axial force on the friction washer in the direction of the second rotary element; and an actuating washer comprising an actuating tab arranged circumferentially between a first end of said spring and the first rotary element so as to allow relative rotation between the actuating washer and the second rotary element when the first end of the spring is moved by the first rotary element, via the actuating tab, in the direction of a second end of the spring that is opposite to the first end, the actuating washer being able to drive the friction washer in rotation so that when the actuating washer and the second rotary element are rotating one with respect to the other, the friction washer rubs directly or indirectly against the second rotary element, wherein the actuating washer further comprises an angular stop and the second rotary element comprises a complementary stop, the angular stop and the complementary stop being arranged in such a way that the actuating washer is coupled in rotation with the second rotary element when the second rotary element compresses the first end of the spring in the direction of the second end of the spring opposite to the first end, and wherein an axial finger coupling the actuating washer and friction washer forms said angular stop and the slot forms said complementary stop.

15. A torsion damping device for a vehicle drivetrain, comprising:

a first rotary torque-transmission element provided with a first housing;

a second rotary torque-transmission element provided with a second housing;

an elastic device interposed between the first rotary element and the second rotary element and, when the elastic device deforms, allowing relative rotation of the first and second rotary elements about an axis of rotation, the elastic device comprising at least one spring which is mounted both in the first housing and in the second housing;

a friction device comprising:
a friction washer arranged to rub directly or indirectly against the second rotary element;

an axial support which in terms of rotation is solid with the second rotary element;

an elastic washer arranged between the axial support and the friction washer so as to exert an axial force on the friction washer in the direction of the second rotary element; and an actuating washer comprising an actuating tab arranged circumferentially between a first end of said spring and the first rotary element so as to allow relative rotation between the actuating washer and the second rotary element when the first end of the spring is moved by the first rotary element, via the actuating tab, in the direction of a second end of the spring that is opposite to the first end, the actuating washer being able to drive the friction washer in rotation so that when the actuating washer and the second rotary element are rotating one with respect to the other, the friction washer rubs directly or indirectly against the second rotary element, wherein the actuating washer comprises at least one axial finger collaborating with a notch of the friction washer so as to allow the friction washer to be driven by the actuating washer, wherein the actuating washer comprises an annular portion connecting the actuating tab and the axial finger, and the second rotary element comprises an annular friction surface against which the friction washer is pressed, the annular portion of the actuating washer, and the elastic washer, the axial support and the friction washer, being positioned on the one side and on the other side of the annular friction surface of the second rotary element, and wherein the axial support is formed of an annular flange secured to the second rotary element, the elastic washer and the friction washer being positioned between the annular flange and the annular friction surface of the second rotary element.

* * * * *